3,085,112
PREPARATION OF HYDROCARBON BORON COMPOUNDS
Herbert C. Brown, 1840 Garden St., West Lafayette, Ind.
No Drawing. Filed Dec. 22, 1960, Ser. No. 77,504
15 Claims. (Cl. 260—606.5)

This invention relates to a hydroboration process for preparing a tri-saturated hydrocarbon boron compound by the addition reaction of diborane and a mono-ethylenically unsaturated hydrocarbon, according to the equation $$6RCH=CH_2 + B_2H_6 \rightarrow 2(RCH_2CH_2)_3B$$

wherein R is a saturated hydrocarbon radical such as alkyl or cycloalkyl, and is more particularly concerned with conducting the above reaction in the liquid phase.

Trialkylborons have previously been prepared by a variety of methods, e.g. by the action of alkylmagnesium halides on boron halides in ether solution [Meerwein et al., J. prakt. Chem., 147, 240 (1936)]; by the action of gaseous olefins with aluminum borohydride at elevated temperatures [Brokar et al., J. Am. Chem. Soc. 72, 3237 (1950); ibid., 72, 5263 (1950)]; by the action of aluminum borohydride-ether complexes on olefins; by the action of solutions of alkali metal borohydrides with polyvalent metal halides on olefins [applicant's co-pending application, Serial No. 637,615, filed February 1, 1957, now U.S. Patent 2,925,438].

Until the present invention, diborane and simple olefins could not be reacted together successfully except at elevated temperatures and pressures over long periods of time. Thus, Hurd (J. Am. Chem. Soc., 70, 2053 (1948)) reported that the reaction of diborane with olefinic hydrocarbons required heating of the two reactants in sealed tubes at elevated temperatures for extended periods of time, e.g. a mixture of triisobutylboron and tri-t-butylboron was obtained by the reaction of isobutylene and diborane in a sealed tube at 100° C., for 24 hours; and, reaction of ethylene with diborane at 100° C. for 96 hours produced triethylboron.

A. T. Whatley and R. N. Pease [J. Am. Chem. Soc. 76, 835 (1954)] studied the reaction of olefins with diborane at elevated temperatures. They found the reaction to be relatively slow and the kinetics were complicated.

It is well known that the introduction of certain electronegative groups, such as —$C_6H_5$ and —CN can greatly activate the double bond. Thus, simple olefins, such as ethylene and propylene cannot be polymerized in the absence of catalysts, whereas styrene, $C_6H_5CH=CH_2$, and acrylonitrile, $CH_2=CHCN$, are readily polymerized by heating. Consequently, it is not unexpected that Stone and Emeleus [J. Am. Chem. Soc., 2755 (1950)] observed that styrene will react slowly with diborane at room temperature with a reaction time of 20 hours. However, it is interesting to note that even such liquid olefins with activating groups for the double bond react very slowly with diborane at low temperatures. Stone and Graham also attempted to react diborane with tetrafluoroethylene [Chemistry and Industry, 1181 (1955)]. However, the reaction did not proceed with addition of the boron hydride to the double bond.

It has now been unexpectedly discovered that diborane can be added rapidly and quantitatively to simple olefins (either straight chain or cyclic) without activating groups, by conducting the reaction in liquid phase. The reaction is conducted at temperatures below 100°. A preferred embodiment of this invention comprises the reaction of olefins which are normally gaseous at the reaction temperature and atmospheric pressure, especially ethylene, propylene, and isobutylene. In a particularly preferred embodiment, these olefins are reacted at a temperature below 50° C. and sufficient pressure to initially have a liquid phase and maintain a liquid phase present during the course of the reaction.

The temperature at which the reaction is conducted is generally below about 100° C. while still maintaining the liquid reaction system. The low temperature and liquid reaction system are critical to the fast reaction rate and practical production of the trihydrocarbon boron compound. Thus, temperatures even below 0° C. and lower can be employed so long as the liquid state is maintained, although for best results temperatures above 0° C. are employed. For most efficient operation, the temperature should be maintained below 50° C. and in a particularly preferred embodiment, room temperature is employed.

A particularly unique feature of the process, resulting from the liquid phase operation and temperature conditions discussed above, is that, in general, the molar proportion of the reactants is not critical and has little effect on the hydroboration. Thus, an excess of either reactant can be employed to still achieve fast reaction rates. For best results, however, the mono-ethylenically unsaturated hydrocarbon is employed in amount up to and including the stoichiometric amount with essentially the stoichiometric amount being preferred.

The reaction time is of the general order of 4–12 hours, with the cyclic olefins requiring lesser times. The tri-saturated hydrocarbon boron product can then be recovered from the reaction mixture in relatively pure form as by distillation under reduced pressure (nitrogen atmosphere).

The liquid phase may be an inert solvent, or the starting olefin itself where it is liquid under the reaction conditions, or a previously prepared portion of trialkylboron product itself, or the liquid phase may be an absorbed liquid phase such as that which exists when a gaseous olefin is absorbed on finely divided activated charcoal.

Among the examples of typical olefins which participate in the above reaction are ethylene, propylene, cis- and trans-2-butene, 1-butene, 1-pentene, 2-pentene, 1-, 2-, and 3-hexene, 2-methylpentene-1 or 2,2-methylbutene-1, 1-, 2-, 3-, and 4-heptene, octenes, 1- and 2-diisobutylene, tri- and tetramethylethylene, 1-, 2-, and 3-decene, 1-tetradecene, 1-octadecene, cyclopentene, cyclohexene, cycloheptene, pinene. Of the olefins, the olefins which are normally gaseous at the reaction temperature, especially 25–35° C., but atmospheric pressure, are preferred, especially ethylene, propylene, and isobutylene. Ethylene comprises a particularly preferred embodiment of the invention.

Among the inert solvents which can be used as the liquid phase in which the reaction is conducted are hydrocarbon solvents which can be aliphatic or aromatic or halogenated hydrocarbons, e.g. n-pentane, n-heptane, petroleum hydrocarbon solvents, benzene, toluene, xylene, chlorobenzene, ethylene dichloride, et cetera.

Solvents which are weak Lewis bases, capable of forming unstable complexes (addition compounds) with Lewis acids such as diborane and boron fluoride, such as weakly basic organic compounds containing one of the group VI elements, oxygen, sulfur, selenium, and tellurium (which solvents include ethers such as ethyl ether, tetrahydrofuran, tetrahydropyran, diglyme, anisole, et cetera, thioethers, inorganic esters such as methyl borate, ethyl borate, ethyl silicate, et cetera, organic esters such as ethyl acetate, ethyl benzoate, et cetera, sulfur derivatives such as ethyl sulfide, methyl ethyl sulfide, sulfones, et cetera, and nitro derivatives such as nitromethane and nitrobenzene) are not only solvents, but catalysts which greatly speed the reaction time to a matter of minutes. These are more fully described in my co-pending application, Serial No. 680,934, filed on August 29, 1957.

Where the olefin reactant is a liquid, the reactant may be used to provide the liquid phase for the olefin. Thus, diborane is passed directly into 1-octene to form tri-n-octylboron, and into cyclopentene to form tricyclopentyl boron. An excess of the liquid olefin may be used, but the reaction works well even with only the stoichiometrically required amount present.

Where the olefin reactant is a gas, the gaseous olefin may be used to form an adsorbed liquid phase, by utilizing the known phenomenon that gaseous olefins are strongly adsorbed on inert solids of high surface area, such as silica gel, alumina, activated charcoal, et cetera. The adsorbed hydrocarbon exists on the surface as an adsorbed liquid phase. Thus, diborane (which is itself a gas) and the gaseous olefins such as ethylene and propylene can be passed over these adsorbed liquid phases, even at room temperatures, to produce the corresponding trialkylborons.

A preferred procedure is to utilize the liquid trialkylboron to provide the necessary liquid phase. Thus, propylene and diborane can be passed into tri-n-propylboron (previously prepared) and the product tri-n-propylboron withdrawn at the same rate at which the reactants are added. This comprises a particularly unique embodiment of the invention which has preference in some instances over other embodiments.

A particularly preferred embodiment of the invention is to initially provide and maintain the liquid phase reaction by the temperature and pressure conditions of operation as brought forth above. For example, in an especially unique embodiment of the invention, ethylene is reacted with diborane at room temperature at sufficient pressure to maintain and initially have present liquid ethylene before contact with the diborane. Sufficient pressures are thus generally above atmospheric and can be as high as 5000 p.s.i. and higher, being dictated primarily by the practicalities of the operation. In this connection, the employment of other inert solvents, particularly the hydrocarbons, hydrocarbon halides, or the reaction product, as brought out above, as solvents for effecting the liquid phase reaction comprises an additionally preferred embodiment.

The following examples are offered as illustrative of the processes of the present invention, but are not to be construed as limiting the invention thereto:

EXAMPLE I

Diborane was prepared by adding a solution of boron trifluoride-dimethyl ether of diethylene glycol etherate to a solution of 2 g. of sodium borohydride in the dimethyl ether of diethylene glycol at room temperature. The diborane which then immediately generated, was passed through cold traps maintained at a $-78°$ C. to remove any of the ether that may have been entrained with the diborane. The crude diborane was collected in a liquid nitrogen trap and purified on the vacuum line at repeated low temperature, vacuum transfers, and finally collected in a liquid nitrogen trap. Isobutylene, 1135 milligrams, was also purified in a similar manner. A reaction tube having a volume of 7 ml., immersed in a liquid nitrogen bath, was employed and isobutylene was condensed into the tube followed by diborane, 24.3 milligrams, so that about 2 weight percent diborane was present in the mixture in the tube. The tube was then sealed. The tube was then removed from the liquid nitrogen bath and permitted to warm to room temperature wherein the solids became liquid. It was maintained at this temperature for three hours. At the end of this period, the tube was again immersed in liquid nitrogen, opened and allowed to warm to room temperature under a nitrogen atmosphere. The liquid which remained in the tube was transferred to a three-necked flask and the tube rinsed several times with hexane to remove all traces of alkyl borane product. The alkyl borane suspended in the hexane was then oxidized in the usual manner employing alkaline-hydrogen peroxide in excess. There was obtained 281 milligrams of isobutyl alcohol which represented a yield of 82 percent hydroboration.

When this procedure was duplicated as described except that the reaction period employed was 21 hours, essentially the same yield was obtained.

By way of contrast, the prior art technique of reacting diborane with isobutylene in the gaseous phase was employed by repeating the above three-hour reaction period experiment essentially as described with exception that the tube employed had a volume of 280 milliliters so that when the tube was sealed, no liquid was evident at room temperature. Additionally, 454 milligrams of isobutylene and 23.4 milligrams of diborane were employed so that about 4.9 weight percent diborane was present in the mixture, but again a considerable excess of the isobutylene was employed. At the end of the three-hour reaction period, the tube was opened in the same manner as described above with all gases escaping. Upon recovery of the product and subsequently oxidizing, it was found that 7.45 milligrams of isobutanol were obtained representing a yield of 2 percent. When this gaseous phase reaction was then repeated with the exception that the reaction period was 21 hours, 14.38 milligrams of isobutanol were recovered representing a yield of 4 percent.

The above comparative runs illustrate the vast difference in the reaction of diborane with olefins in a liquid phase system versus the gaseous reaction described in the prior art. As noted in the liquid phase reaction of the present invention at 3 hours, an essentially quantitative yield was obtained versus only a 2 percent yield for the prior art gaseous reaction and at 21 hours, the yield in the liquid phase reaction had not changed and was essentially quantitative, whereas the prior art gaseous reaction only resulted in a 4 percent yield. This illustrates the greater efficiency and effectiveness of the presently claimed invention.

Similar results are obtained as in the above liquid phase reactions when employing ethylene as the olefin at $0°$ C. and 1000 p.s.i. pressure or propylene as the olefin employing room temperature and 300 p.s.i. pressure.

EXAMPLE II

*Use of Olefin Reactant as Liquid Phase*

The apparatus which was used was a dry 500 milliliter round-bottomed flask fitted with an all glass gas dispersion tube and an outlet so that the system could be completely closed to outside atmosphere. The exit gas outlet was connected to a mercury bubbler and then bubbled into anhydrous acetone so that unreacted diborane, if any, was reacted with acetone. No separate stirring was used, since vigorous bubbling of diborane gas through the liquid phase caused sufficient mixing of the reactants. The apparatus was flushed with dry nitrogen before being connected to a source of diborane.

(A) Tri-n-hexylboron: Using the above apparatus, carefully purified diborane was passed into 50.4 grams (0.6 mole) of 1-hexane at room temperature. Absorption of the stoichiometrically required amount of diborane (0.10 mole) occurred and was complete in about 10 hours. Upon fractional distillation of the reaction mixture at reduced pressure, an almost quantitative yield of tri-n-hexylboron, boiling point 185–188° C./33 mm. was obtained.

(B) Tricyclohexylboron: Following the procedure of Example II(A), but using 0.6 mole of cyclohexene as the olefin reactant, there was obtained in approximately four hours an almost quantitative yield of tricyclohexylboron, boiling point 130–132° C./2 mm.

(C) Following the procedure of Example II(A), but using 3.0 moles of cyclopentene, of 1-octene, and of 3-octene, there was obtained tricyclopentylboron, tri-n-octylboron and tri-sec-octylboron respectively. The use of an excess of olefin tended to speed reaction time slightly.

EXAMPLE III

Use of Inert Solvent as Liquid Phase

Using the apparatus and procedure of Example II, 50.4 grams of 1-hexene (0.6 mole) and 100 milliliters of n-heptane were placed in the round-bottomed flask. Then, 0.10 mole of carefully purified diborane was slowly and continuously introduced into the flask. Reaction temperature was 25–30° C., and reaction time was about 9 hours, after which fractional distillation of the contents of the reaction flask resulted in the recovery of over 80 percent of the theoretical yield of tri-n-hexylboron, boiling point 185–188° C./30 mm.

The above procedure was repeated except that 2-decene was used as the olefin and benzene as the inert solvent, and resulted in the recovery of over 80 percent of the theoretical yield of tri-n-decylboron.

The above procedure was again repeated except that cyclohexene was used as the olefin and toluene as the inert solvent, and resulted in the recovery of over 80 percent of the theoretical yield of tricyclohexylboron.

EXAMPLE IV

Use of Product as Liquid Phase

Using the procedures and apparatus of the previous examples, 50 grams of tri-n-hexylboron (prepared in an earlier batch by the procedure of Example II(A)), and 100.8 grams (1.2 moles) of 1-hexene were placed in the reaction flask and reacted with 0.20 mole of pure diborane gas which was continuously bubbled into the reaction flask over a period of about 9 hours. Reaction temperature was about 25–35° C. Fractional distillation of the contents of the reaction flask resulted in the isolation of 145 grams of tri-n-hexylboron, all of the starting tri-n-hexylboron, plus 90 percent of the theoretical yield of the tri-n-hexylboron product produced.

The above procedure was repeated with 1-octene using a previously prepared portion of tri-n-octylboron as the liquid phase. The reaction temperature was 95° C., and the reaction time was about 8 hours. Over 85 percent of the theoretical yield of product, of tri-n-octylboron, was recovered.

The above procedure was repeated with diisobutylene-1 (2,4,4-trimethyl pentene-1) using a previously prepared portion of tridiisobutylboron as the liquid phase. The reaction temperature was maintained at 0° C., and reaction time was about 12 hours. Over 80 percent of the theoretical yield of product, of tri-n-octylboron, was recovered.

When the above procedure is repeated using triethylboron, and triisopropylboron initially as the liquid phase for reaction of diborane with ethylene and isopropylene, respectively at room temperature, a fast conversion to the respective products is obtained.

EXAMPLE V

Use of Absorbed Liquid Phase

Using the apparatus of Example I, 100 grams of finely divided activated charcoal were placed in the reaction flask. Then, 0.6 mole of 1-butene gas and 0.12 mole of pure diborane were slowly passed into the reaction vessel under slight pressure. The reaction period was about 6 hours. The reaction product, tri-n-butylboron, was recovered in over 75 percent yield by extracting the activated charcoal and contents of the reaction flask with ether, followed by distillation.

This application is a continuation-in-part of my prior co-pending application, Serial No. 680,933, filed August 29, 1957, now abandoned.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for preparing a tri-saturated hydrocarbon boron compound by the addition reaction of diborane and a mono-ethylenically unsaturated hydrocarbon, selected from the group consisting of olefins and cyclo-olefins, the step which consists essentially of conducting said reaction in liquid phase at a temperature below 100° C.; said liquid phase subsisting in the reaction zone by virtue of the presence therein of at least 1 member of the group consisting of
   (a) an inert liquid hydrocarbon selected from the group consisting of paraffinic and aromatic hydrocarbons,
   (b) a mono-ethylenically unsaturated hydrocarbon which is present in the reaction zone as a liquid and is selected from the group consisting of olefins and cycloolefins,
   (c) a liquid tri-saturated hydrocarbon boron compound, and
   (d) a normally gaseous mono-ethylenically unsaturated hydrocarbon which is selected from the group consisting of olefins and cycloolefins and is absorbed on an inert solid having a large surface area.

2. The process of claim 1 wherein said olefin is a normally gaseous olefin at the reaction temperature and atmospheric pressure.

3. Process of preparing a tri-saturated hydrocarbon boron compound by reacting, in liquid phase, diborane with a mono-ethylenically unsaturated hydrocarbon selected from the group consisting of olefins and cycloolefins at a temperature below 100° C., and recovering said tri-saturated hydrocarbon boron compound from the reaction mixture; said liquid phase subsisting in the reaction zone by virtue of the presence therein of at least 1 member of the group consisting of
   (a) an inert liquid hydrocarbon selected from the group consisting of paraffinic and aromatic hydrocarbons,
   (b) a mono-ethylenically unsaturated hydrocarbon which is present in the reaction zone as a liquid and is selected from the group consisting of olefins and cycloolefins,
   (c) a liquid tri-saturated hydrocarbon boron compound, and
   (d) a normally gaseous mono-ethylenically unsaturated hydrocarbon which is selected from the group consisting of olefins and cycloolefins and is adsorbed on an inert solid having a large surface area.

4. Process of claim 3 wherein the reaction is conducted at a temperature ranging from about 0° C. to below 100° C.

5. Process of claim 4 wherein the time of reaction is less than 12 hours.

6. Process of preparing a tri-saturated hydrocarbon boron compound by reacting diborane with a mono-ethylenically unsaturated hydrocarbon selected from the group consisting of olefins and cycloolefins at a temperature below 100° C. in an inert liquid solvent selected from the group consisting of paraffinic and aromatic hydrocarbons, and recovering said tri-saturated hydrocarbon boron compounds from the reaction mixture.

7. Process of preparing a tri-saturated hydrocarbon boron compound by reacting diborane with a liquid mono-ethylenically unsaturated hydrocarbon, selected from the group consisting of olefins and cycloolefins, said unsaturated hydrocarbon being present as a liquid and in an amount at least slightly in excess of that stoichiometrically required, at a temperature below 100° C. and recovering said tri-saturated hydrocarbon boron compound from the reaction mixture.

8. Process of preparing a tri-saturated hydrocarbon boron compound by passing diborane and a gaseous mono-ethylenically unsaturated hydrocarbon selected from the group consisting of olefins and cycloolefins over an adsorbed liquid phase consisting of said gaseous unsaturated hydrocarbon adsorbed on activated charcoal having a large surface area, at a temperature below 100° C., and recovering said tri-saturated hydrocarbon boron compound from the reaction mixture.

9. Process of preparing a tri-saturated hydrocarbon boron compound by passing diborane and a mono-ethylenically unsaturated hydrocarbon selected from the group consisting of olefins and cycloolefins through a liquid phase consisting of a previously prepared portion of the desired tri-saturated hydrocarbon boron compound, at a temperature below 100° C. and withdrawing the tri-saturated hydrocarbon boron compound which forms at a rate equal to that at which the initial reactants are added.

10. Process of preparing a trialkylboron compound by reacting, in liquid phase, diborane with a straight chain olefin, at a temperature below 100° C., and recovering said trialkylboron compound from the reaction mixture; said liquid phase subsisting in the reaction zone by virtue of the presence therein of at least 1 member of the group consisting of
   (a) an inert liquid hydrocarbon selected from the group consisting of paraffinic and aromatic hydrocarbons,
   (b) a mono-ethylenically unsaturated hydrocarbon which is present in the reaction zone as a liquid and is selected from the group consisting of olefins and cycloolefins,
   (c) a liquid tri-saturated hydrocarbon boron compound, and
   (d) a normally gaseous mono-ethylenically unsaturated hydrocarbon which is selected from the group consisting of olefins and cycloolefins and is adsorbed on an inert solid having a large surface area.

11. Process of claim 10 wherein the reaction is conducted at a temperature ranging from 0° C. to below 100° C., and wherein the time of reaction is less than 12 hours.

12. Process of claim 11 wherein the trialkylboron compound is tri-n-hexylboron, and the olefin is 1-hexene.

13. Process of claim 12 wherein the liquid phase includes the inert solvent, n-heptane.

14. Process of claim 12 wherein the liquid phase includes a previously prepared portion of tri-n-hexylboron.

15. Process of preparing a tricycloalkylboron compound by reacting, in liquid phase, diborane with a cyclic olefin, and recovering said tricycloalkylboron compound from the reaction mixture; said liquid phase subsisting in the reaction zone by virtue of the presence therein of at least 1 member of the group consisting of
   (a) an inert liquid hydrocarbon selected from the group consisting of paraffinic and aromatic hydrocarbons,
   (b) a mono-ethylenically unsaturated hydrocarbon which is present in the reaction zone as a liquid and is selected from the group consisting of olefins and cycloolefins,
   (c) a liquid tri-saturated hydrocarbon boron compound, and
   (d) a normally gaseous mono-ethylenically unsaturated hydrocarbon which is selected from the group consisting of olefins and cycloolefins and is adsorbed on an inert solid having a large surface area.

References Cited in the file of this patent
UNITED STATES PATENTS

| | | |
|---|---|---|
| 2,964,567 | Neff | Dec. 13, 1960 |
| 2,977,389 | De Lorenzo et al. | Mar. 28, 1961 |
| 2,977,390 | Weiss | Mar. 28, 1961 |